(12) United States Patent
Schnell et al.

(10) Patent No.: US 12,548,551 B1
(45) Date of Patent: Feb. 10, 2026

(54) TEXT-TO-SPEECH PROCESSING

(71) Applicant: Amazon Technologies, Inc., Seattle, WA (US)

(72) Inventors: Bastian Schnell, Berlin (DE); Sri Vishnu Kumar Karlapati, Cambridge (GB); Alexis Pierre Jean-Baptiste Moinet, Cambridge (GB); Panagiota Karanasou, Cambridge (GB); Thomas Renaud Drugman, Carnieres (BE); Syed Ammar Abbas, Cambridge (GB); Ewa Magdalena Muszynska, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 18/216,697

(22) Filed: Jun. 30, 2023

(51) Int. Cl.
    *G10L 13/08* (2013.01)

(52) U.S. Cl.
    CPC ................... *G10L 13/08* (2013.01)

(58) Field of Classification Search
    CPC ........................................ G10L 13/08
    See application file for complete search history.

(56) References Cited

U.S. PATENT DOCUMENTS 10,832,668 B1 * 11/2020 Devries .................. G10L 15/22
2018/0268806 A1 * 9/2018 Chun ..................... G10L 13/027

FOREIGN PATENT DOCUMENTS

CN      114842834 A     8/2022

OTHER PUBLICATIONS

U.S. Office Action mailed on Jun. 23, 2025 for U.S. Appl. No. 18/216,705.
Sittichai Jiampojamarn. "Grapheme-to-phoneme conversion and its application to transliteration," Doctoral dissertation University of Alberta, 2011, 108 pages.
Tara N. Sainath, et al. "Joist: A Joint Speech and Text Streaming Model for ASR," 2022 IEEE Spoken Language Technology Workshop (SLT), 2023, pp. 52-59.

(Continued)

Primary Examiner — Huyen X Vo
(74) Attorney, Agent, or Firm — Pierce Atwood LLP

(57) ABSTRACT

A speech-processing system may be configured to generate expressive synthesized speech. The system may include a prosody prediction model that generates a combination of durations and acoustic representations that may be based on the content of the text as well as additional context information. The model may be trained to predict a joint probability between linguistic representations (e.g., derived from text) and combined duration/acoustic representations (e.g., derived from audio). At inference, the model can process linguistic representations derived from text to predict combined duration/acoustic representations. In some implementations, the model may process additional information; for example, semantic embeddings output by a language model based on the text. In another example, the model may receive a speaker embedding representing voice characteristics of a particular speaker. A decoder may process the durations and acoustic representations output by the model to generate audio data representing the synthesized speech and representing expressive prosodic variation.

20 Claims, 11 Drawing Sheets

(56) References Cited

OTHER PUBLICATIONS

Muhammad Huzaifah, et al. "An Analysis of Semantically-Aligned Speech-Text Embeddings," 2022 IEEE Spoken Language Technology Workshop (SLT), 2023, pp. 747-754.
Bhuvan Agrawal, et al. "Tie Your Embeddings Down: Cross-Modal Latent Spaces for End-to-End Spoken Language Understanding," arXiv preprint arXiv:2011.09044v2, 2021, 7 pages.
Jihyun Park, et al. "Multi-Speaker End-to-End Speech Synthesis," arXiv preprint arXiv: 1907.04462v1, 2019, 8 pages.
Eleanora Ganio Mego. "Metonymy Resolution with BERT and RoBERTa: what language models can infer about the interpretation of metonymy," 2023 Masters Thesis Universita Foscari Venezia, 2023, 118 pages.
Yuechi Jiang, et al. "Investigating and improving the utility of probabilistic linear discriminant analysis for acoustic signal classification," Digital Signal Processing, vol. 114, 2021, 15 pages.
Yung-Sung Chuang, et al. "SpeechBERT: An Audio-and-text Jointly Learned Language Model for End-to-end Spoken Question Answering," arXiv preprint arXiv: 1910.011559v4, 2020, 6 pages.
Ankur Bapna, et al. "SLAM: A Unified Encoder for Speech and Language Modeling via Speech-Text Joint Pre-Training," arXiv prepint arXiv:2110. 10329v1, 2021, 13 pages.
Benjamin Elizalde, et al. "Cross Modal Audio Search and Retrieval with Joint Embeddings Based on Text and Audio," 2019 IEEE International Conference on Acoustics, Speech and Signal Processing (ICASSP), 2019, pp. 4095-4099.

\* cited by examiner

TEXT-TO-SPEECH PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
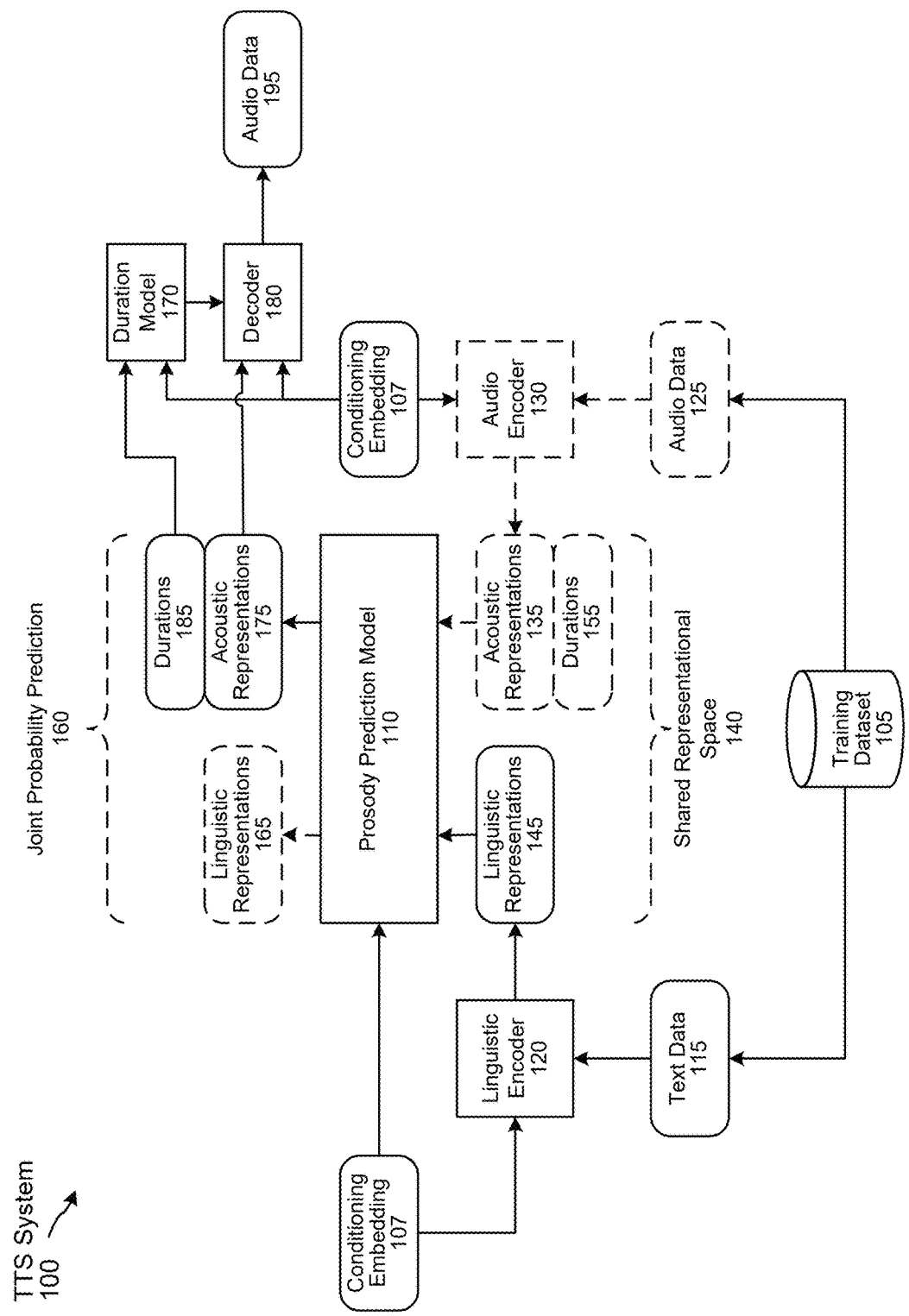
FIG. 1 is a conceptual diagram of a text-to-speech (TTS) system, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system that can communicate with a user by processing spoken inputs and responding with synthesized speech. In some cases, TTS may be used to deliver other content to a user by generating synthesized speech representing an e-book, news article, sports commentary, closed captions and/or subtitles, text and/or email messages, etc. A speech-processing system may additionally receive other inputs and provide other outputs.

The speech processing system may perform actions for and/or on behalf of users. Many of these actions involve generating synthesized speech to, for example, respond to a question or request, deliver a notification, or recite text from a message, article, book, etc. The expressiveness of human speech may manifest as variation in prosodic aspects of speech separate from the phonetic segments of the words being spoken. For example, human speakers may vary intonation, stress, rhythm, etc., depending on the content and/or context of the speech. Without this prosodic variation, speech may sound monotonous or robotic, and may even be difficult to follow for more than a few sentences (e.g., listener gets bored listening, starts daydreaming, etc.). Generating synthetic speech that reflects the expressiveness of human speech is difficult and, when realized effectively, may improve the user experience by providing synthesized speech that sounds more natural and engaging, and which may in turn improve the intelligibility of some content. This is particularly true for, for example, long-form reading and/or dialogs involving dozens or more of words to be synthesized at a time.

Offered herein are techniques for generating expressive synthesized speech. A TTS system may include a prosody prediction model that generates a combination of durations and acoustic representations that may be based on the content of the text as well as additional context information. The network may be trained to predict a joint probability between linguistic representations (e.g., derived from text) and combined duration/acoustic representations (e.g., derived from audio). The network may be, for example, a large autoregressive transformer. During runtime inference, the network can process linguistic representations derived from input text to predict combined duration/acoustic representations. In some implementations, the network may process additional information; for example, contextualized word embeddings generated by a language model based on the text. A contextualized word embedding may represent a semantic context of a word that takes into account its use in a particular sentence (e.g., in the context of the phrase, clause, sentence, etc., in which the word appears). In another example, the network may receive a speaker embedding representing voice characteristics of a particular speaker. In yet another example, the network may receive context information from beyond the sentence (e.g., related to the user, the user device, the source of the text, etc.). A decoder may process the durations and acoustic representations output by the network to generate audio data representing the synthesized speech and representing expressive prosodic variation.

A further aspect of this disclosure relates to techniques for generating a more information-rich representation of prosody for use in training the prosody prediction model. An audio encoder may be configured to process audio data to generate an acoustic representation of speech in the audio data. Similarly, a linguistic encoder may be configured to process text data (and/or other content such as phonemes or other linguistic units derived from text data) to generate a linguistic representation of the content. In some implementations, the audio encoder and the linguistic encoder may be configured to generate outputs corresponding to a multi-modal, shared representation space. The representation space is referred to as "shared" and/or "multi-modal" because processing audio data and text data that correspond to the same speech may result in similar representations in the space. For example, using a training dataset of audio data representing speech and a text data representing a transcript of the speech, the audio encoder and linguistic encoder may be trained by comparing their outputs and bringing them into convergence. Thus, for a given speech sample, the audio encoder may be trained to generate an acoustic representation that matches a linguistic representation generated by the linguistic encoder based on the text data corresponding to the speech sample. Similarly, for a given segment of text data, the linguistic encoder may be trained to generate a linguistic representation that matches an acoustic representation generated by the acoustic encoder based on the speech sample corresponding to the given segment of text data.

By training the encoders to generate acoustic representations and linguistic representations in this shared space, the linguistic encoder learns to predict more prosodic information from the text data, and the audio encoder learns to extract more prosodic information from the audio data. In addition, the audio encoder learns to disregard aspects of audio data unrelated to prosody (e.g., room noise, reverberations, breathing, etc., that have no correlation to the text data). The richer acoustic representations and linguistic representations may allow for improved training of the prosody prediction model. During runtime inference, the linguistic encoder may be able to predict more prosodic information from the text. The availability of more prosodic information during training and inference may allow the network to synthesize speech having improved expressivity.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 7A:
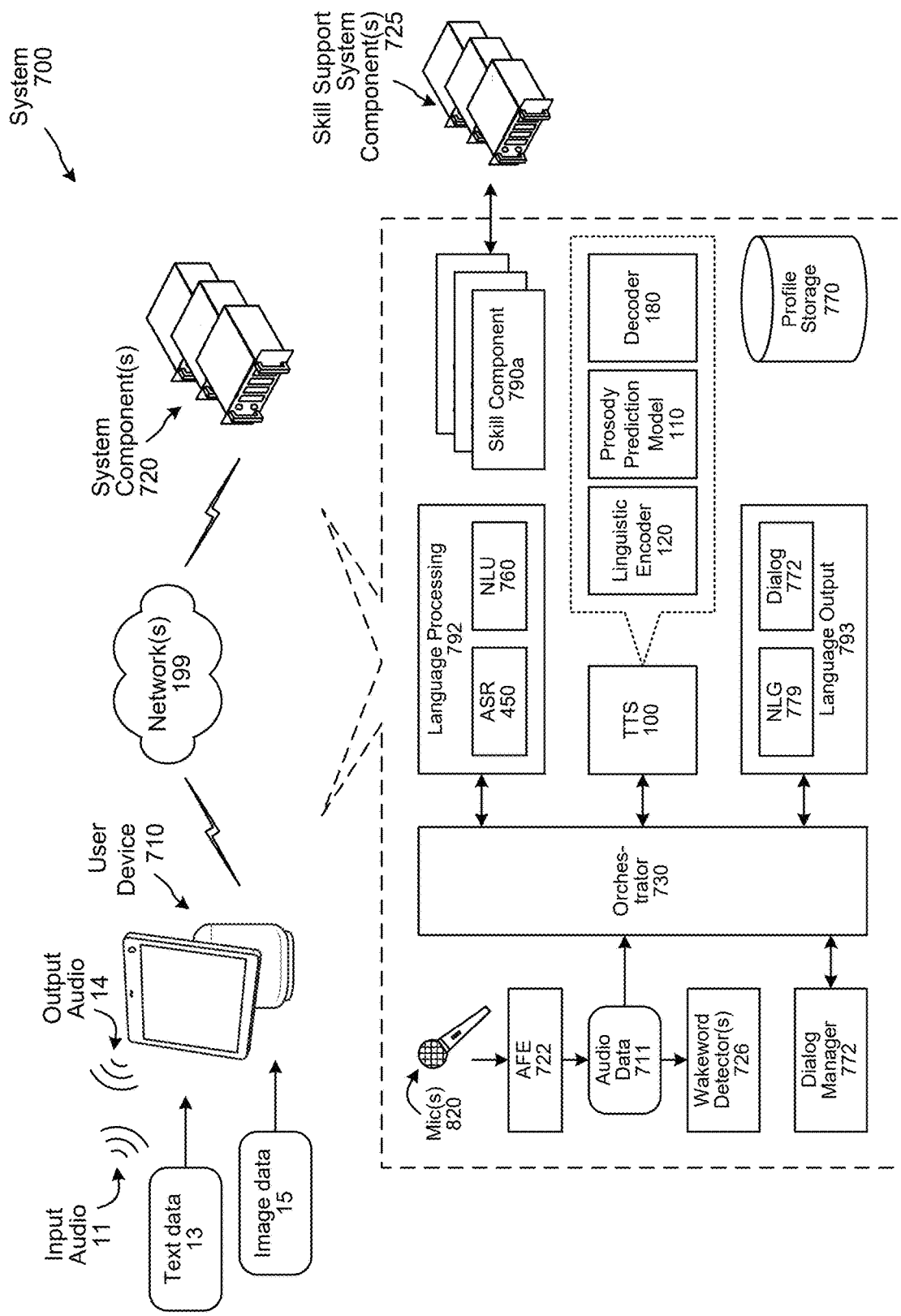
FIG. 7A is a conceptual diagram of components of the system, according to embodiments of the present disclosure.

FIG. 1 is a conceptual diagram of a text-to-speech (TTS) system 100, according to embodiments of the present disclosure. The TTS system 100 may be a part of a natural language command processing system 700, shown in FIG. 7A. A user 5 may interact with a user device 710 using a combination of inputs and outputs including voice, text, and/or images. The user may speak or otherwise provide input audio 11 to the user device 710. The user device 710 may respond with synthesized speech and/or other output audio 14. The user device 710 may also receive text data 13 and/or image data 15 as shown in FIG. 7A. In various implementations, the user device 710 may be one of the user devices 710 shown in FIG. 10 and may have a visual display (e.g., monitor). The user device 710 may include various hardware and/or software components such as those shown in FIG. 8. In some implementations, the profile identification features shown herein may be performed by components on the user device 710. In some implementations, some of the components described in FIG. 1 may reside on one or more system components 720 as shown in FIG. 7A. In some implementations, the components and/or the functions of the components may be shared and/or divided between a user device 710 and one or more system components 720. One or more user devices 710 and, in some implementations, one or more system components 720, may make up the system 100. The system 100 may include more or fewer components without departing from the scope of this disclosure.

Returning to FIG. 1, the TTS system 100 may include features for synthesizing expressive speech. FIG. 1 shows components of the TTS system 100. Some of the components may be used during training, some may be used during inference, and some may be used during both training and inference. In some implementations, the TTS system 100 may operate using fewer components, additional components, and/or different components than those shown in FIG. 1. FIGS. 2 through 6 describe additional example implementations and operations of the TTS system 100.

The TTS system 100 may include a linguistic encoder 120 configured to encode text data 115 into linguistic representations 145. The text data 115 may include content (e.g., a book, news article, etc.) for generating synthesized speech and/or training data for training components of the TTS system 100. The content may be used to generate synthesized speech in one or more human-understandable languages (e.g., spoken natural languages). The TTS system 100 may include a prosody prediction model 110 configured to process the linguistic representations 145 to generate acoustic representations 175 that may be used to synthesize speech in the form of audio data 195. The audio data 195 may represent synthesized speech in any human-understandable language (e.g., English, Mandarin, Hindi, etc.). As used herein, "representations" may refer to data, generated by a machine learning component such as a neural network, that conveys information about source data processed by the machine learning component. Such representations may be referred to as representational data, embeddings, latents, encoded data, hidden data, or the like. The representational data may be in the form of a vector, matrix, or array and may have a particular dimensionality (e.g., a vector having 80 elements may be said to have a dimensionality of 80 or 1×80, where each element is a scalar value). The type and format of information conveyed by representational data may depend on the configuration and/or training of the machine learning component.

The linguistic encoder 120 may be configured to process the text data 115 to generate the linguistic representations 145, which may convey certain information about the text data 115. Prior to processing by the linguistic encoder 120, phonetic data may be determined from text data 115. Thus, the input to the linguistic encoder 120 may be in the form of linguistic unit tokens (e.g., corresponding to characters, phonemes, syllables, subwords, words, etc.) and/or other data representing the phonetic and/or linguistic content of the text data 115. In the TTS system 100, the linguistic encoder 120 may be configured to generate linguistic representations 145 that convey prosodic information about the text data 115, as explained further below.

The TTS system 100 may include an audio encoder 130 configured to encode audio data 125 representing speech. A training dataset 105 may include audio data 125 representing recorded speech, and text data 115 representing a transcript of the speech. The audio data 125 may be in the form of, for example, mel-spectrograms representing the frequency content of frames of audio data and/or raw waveform data. The audio encoder 130 may be configured to generate acoustic representations 135 that convey prosodic information about the speech.

To increase the prosodic information available to the prosody prediction model 110, the linguistic encoder 120 and the audio encoder 130 may be configured to encode the text data 115 and audio data 125, respectively, into a shared representational space 140. For example, both encoders may be trained to maximize the cosine similarity between the linguistic representations 145 and the acoustic representations 135 corresponding to a speech sample or portion of a speech sample, and to minimize the cosine similarity with other samples in the training dataset 105. This training may cause both encoders to represent their respective input sequence in a compressed representation while keeping the representations separable. Thus, the audio encoder 130 may capture details of the audio data 125 that are predictable by the linguistic encoder 120 based on the corresponding text data 115.

In some implementations, the training may take into account duration data 155 corresponding to the speech samples. The duration data 155 may represent durations of linguistic units (e.g., phonemes, subwords, words, etc.) identified in the speech in the audio data 125 using, for example, ASR. The duration data 155 may be combine with the acoustic representations 135 generated by the audio encoder 130 by, for example, concatenation. When the linguistic encoder 120 and the audio encoder 130 are trained, the linguistic encoder 120 may learn to predict duration data 155 from the text data 115. Training of the linguistic encoder 120 and the audio encoder 130 is described in further detail below with reference to FIGS. 4 and 5.

Figure 6:
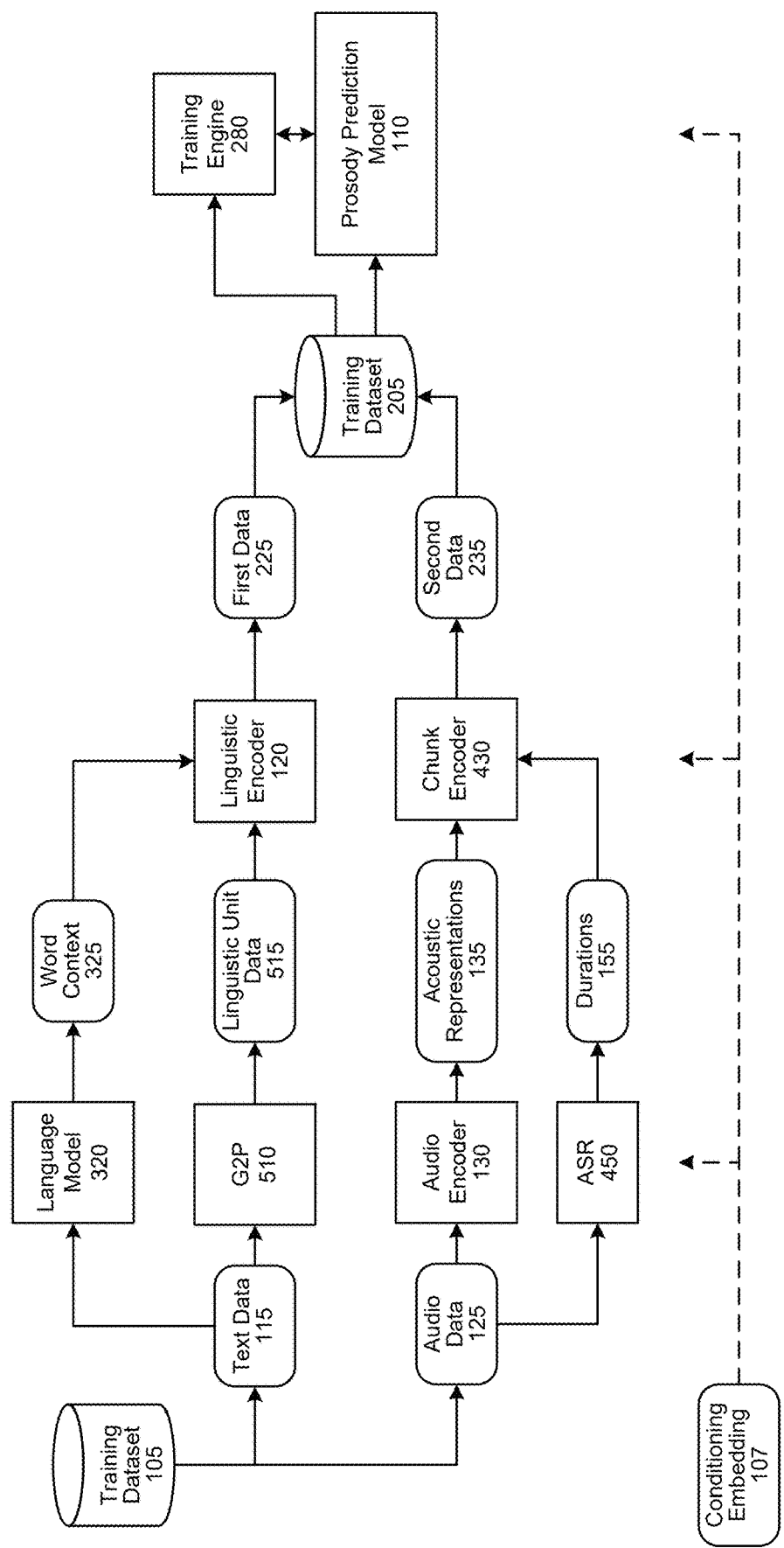
FIG. 6 illustrates example operations for using the linguistic encoder and audio encoder to generate a training dataset for the prosody prediction model, according to embodiments of the present disclosure.

Once the linguistic encoder 120 and audio encoder 130 are trained, they may be used to generate a training dataset 205 for training the prosody prediction model 110. FIG. 6, described below, shows example operations for using the linguistic encoder 120 and audio encoder 130 to generate a training dataset for the prosody prediction model 110. The trained linguistic encoder 120 may also be used to generate linguistic representations 145 for input to the prosody prediction model 110 at runtime to generate synthesized speech.

The prosody prediction model 110 may be trained to generate the acoustic representations 175 using a joint probability prediction 160 corresponding to the linguistic representations 145 and the acoustic representations 135 (as well as linguistic representations 165 corresponding to the linguistic representations 145 and the acoustic representations 135). A conditional probability $P(y|x)$ represents the probability of y given x, where x represents linguistic features such as those encoded in the linguistic representations 145 and y represents acoustic features (such as those encoded in the acoustic representations 135) and durations (such as those conveyed by the duration data 155). In contrast, the prosody prediction model 110 may be trained to estimate the joint probability $P(y,x)=P(y|x)P(x)$ based not only on the conditional probability $P(y|x)$, but also the prior $P(x)$. In other words, the prosody prediction model 110 may also learn how likely a sequence of linguistic units is, and weights the likelihood of the output y by the likelihood the input x corresponds to data the prosody prediction model 110 has seen. In some implementations, training of the prosody prediction model 110 may take into account duration data 155 corresponding to linguistic unit durations determined from the audio data 125. Training the prosody prediction model 110 is described in further detail below with reference to FIGS. 2 and 3.

Once trained, the prosody prediction model 110 may receive linguistic representations 145 generated by the linguistic encoder 120 based on text data 115 corresponding to speech to by synthesized. The prosody prediction model 110 may predict acoustic representations 175 and/or duration data 185. A decoder 180 may process the acoustic representations 175 to generate audio data 195 representing the synthesized speech. In some implementations, the prosody prediction model 110 may additionally predict duration data 185. A duration model 170 may encode the duration data 185 for use by the decoder 180 in generating the audio data 195 based on the acoustic representations generated by the prosody prediction model.

In some implementations, the linguistic encoder 120 and/or the prosody prediction model 110 may take into account additional information during training and/or inference. For example, the linguistic encoder 120, audio encoder 130, and/or prosody prediction model 110 may receive a conditioning embedding data 107 representing, for example, contextualized word embeddings generated from the text data 115 using a language model, context from beyond the sentence being synthesized, a speaker embedding representing voice characteristics corresponding to a particular speaker or to synthesized speech to be generated, etc. In addition, the conditioning embedding data 107 may be used at runtime by the duration model 170 and/or the decoder 180 to generate synthesized speech that reflects a particular context and/or speaker-specific voice characteristics. Generation and use of conditioning embedding data 107 is described in further detail below with reference to FIGS. 3 and 5.

Figure 2:
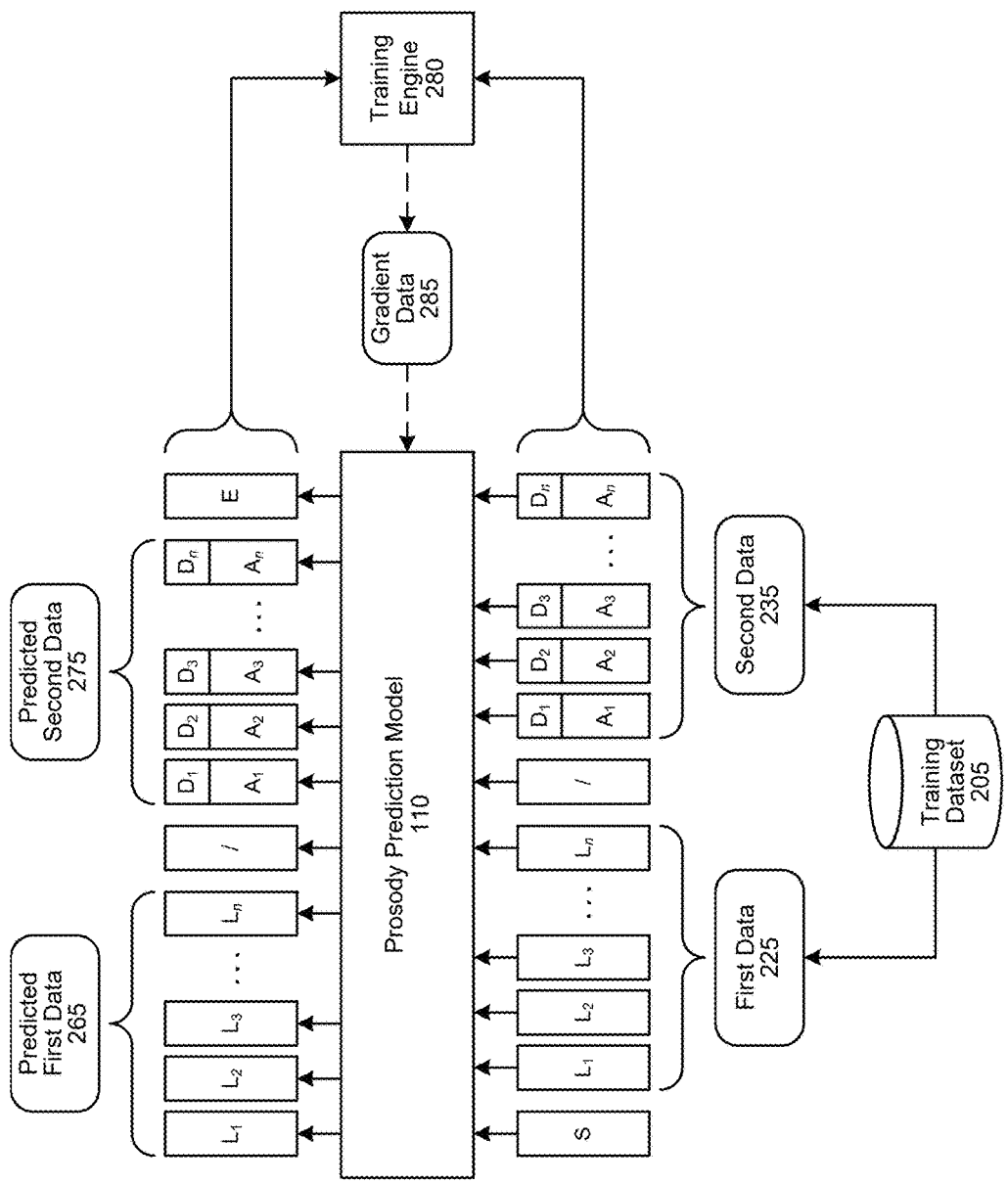
FIG. 2 is a conceptual diagram illustrating example operations for training a prosody prediction model of the TTS system, according to embodiments of the present disclosure.

FIG. 2 is a conceptual diagram illustrating example operations for training the prosody prediction model 110 of the TTS system 100, according to embodiments of the present disclosure. The prosody prediction model 110 may be, for example, an autoregressive neural network. In some implementations, the prosody prediction model 110 may be a massive autoregressive transformer. An autoregressive network may predict a variable or variables in a sequence that depends in part on previously predicted variables in the sequence. Thus, an output of the prosody prediction model 110 may become an input of the prosody prediction model 110 when predicting the next variable in the sequence. The prosody prediction model 110 may model a joint distribution $P(y,x)=P(y|x)P(x)$. Once trained, the prosody prediction model 110 may generate a new sequence based on a given sequence or seed (e.g., a start token denoted as a block labeled "S" in FIG. 2).

To train the prosody prediction model 110, it may process first data 225 and second data 235 from a training dataset 205. The first data 225 may represent linguistic representations such as the linguistic representations 145 generated by the linguistic encoder 120, and the second data 235 may represent acoustic representations such as the acoustic representations 135 generated by the audio encoder 130 (e.g., as described with reference to FIG. 6 below). In some implementations, the second data 235 may also include duration data. The first data 225 "L" tokens may be projected to a dimension matching that of the second data 235 "A+D" tokens (e.g., where the dimensionality of A concatenated with D equals that of L). The first data 225 and the second data 235 may be input into the prosody prediction model 110 as a sequence beginning with a start token denoted with an "S", linguistic representations $L_1, L_2, \ldots L_n$ from the first data 225, a separator token denoted with a "/", and acoustic representations $A_1, A_2, \ldots A_n$ from the second data 235. In some implementations, the second data 235 may include the durations $D_1, D_2, \ldots D_n$. The start token may be used to allow unconditional sampling from the prosody prediction model 110 (e.g., cause it to output a sequence without inputting a sequence). The separator token may be used to indicate the end of the linguistic representations.

Based on the inputs, the prosody prediction model 110 may generate predicted first data 265 (including predicted linguistic representations $L_1, L_2, \ldots L_n$) and predicted second data 275 (including predicted acoustic representations $A_1, A_2, \ldots A_n$), separated by a separator token "/" and terminated with an end-of-sequence token "E". In most cases, however, end-of-sequence token prediction may be unnecessary since the input(s) to the prosody prediction model 110 (e.g., the first data 225) may have a definite endpoint. End-of-sequence prediction may be useful, however, for predicting speech endpoints (e.g., an end-of-sentence) in audio data. The dimensionality of the linguistic representations $L_i$ may equal the dimensionality of the acoustic representations $A_i$ plus that of the durations $D_i$. In some implementations, the durations may have dimensionality of 1 and a value that corresponds to a number of audio frames, fractions of a second, or some other measure related to time. Thus the dimensionality of the linguistic representations may equal that of the acoustic representations plus one. In some implementations, other dimensionalities of the durations, acoustic representations, and linguistic representations may be possible.

The prosody prediction model 110 may be trained using one or more training tasks; for example, next token prediction, masked token prediction, masked punctuation prediction, etc. In some implementations, the prosody prediction model 110 may be trained using functional tokens such as the pause token prediction described below with reference to FIG. 3. For example, a training engine 280 may compare the output sequence (e.g., the predicted first data 265 and predicted second data 275) to the input sequence (e.g., the first data 225 and the second data 235) to determine error data. The error data may be a loss calculated using mean squared error (MSE), sum of squared error (SSE), hinge, cross-entropy, cosine similarity, and/or other loss function. Based on discrepancies in the output sequence from the input sequence as reflected in the error data, the training engine 280 may calculate gradient data 285 which it may then backpropagate through the prosody prediction model 110 to update the parameters of the prosody prediction model 110. Once trained, the prosody prediction model 110 may process linguistic representations 145 generated by the linguistic encoder 120 to generate predict acoustic representations 175, as described above with reference to FIG. 1.

Figure 3:
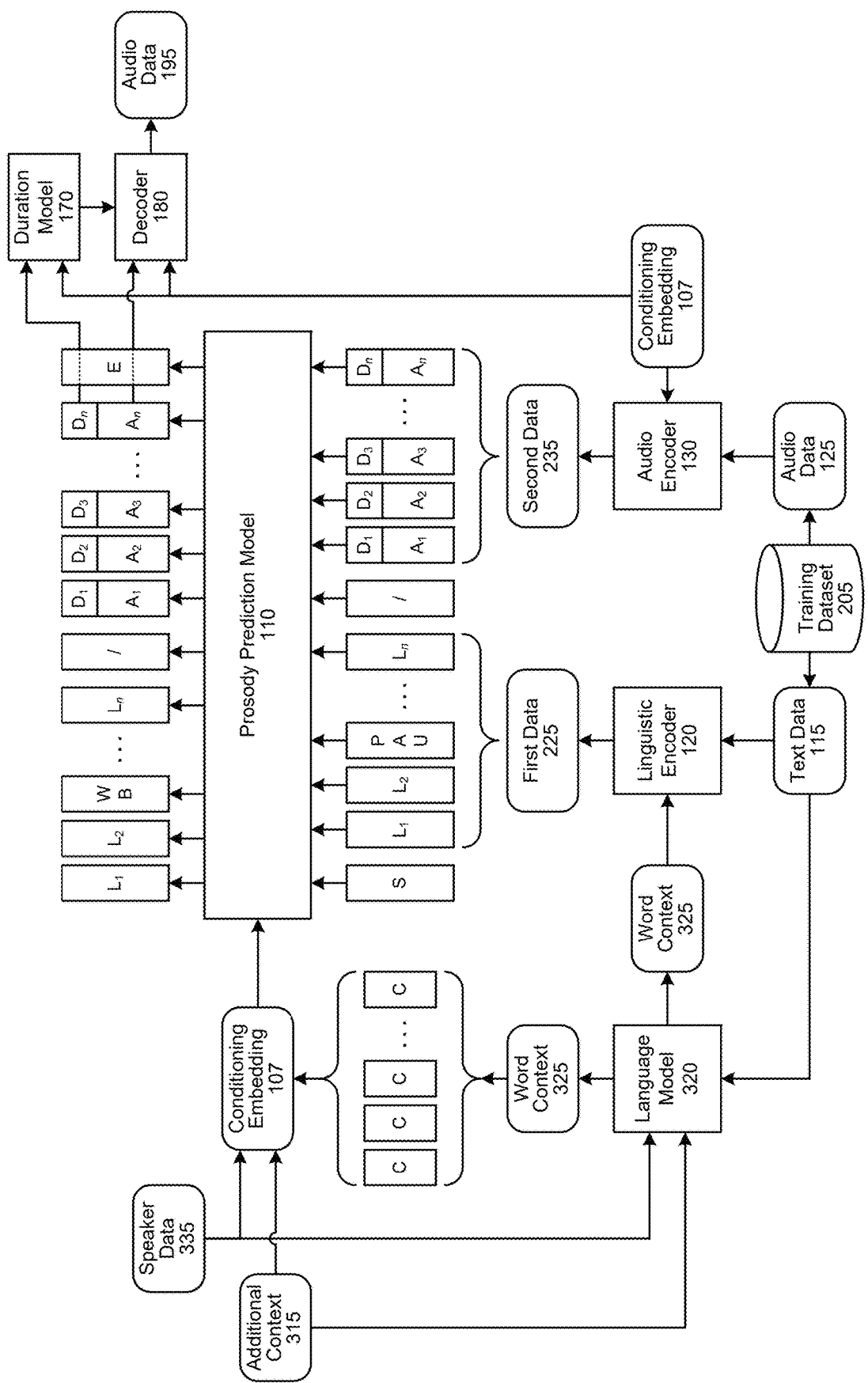
FIG. 3 illustrates example training and inference operations of the TTS system in additional detail, according to embodiments of the present disclosure.

FIG. 3 illustrates example training and inference operations of the TTS system 100 in additional detail, according to embodiments of the present disclosure. In various embodiments, the TTS system 100 may be trained to additionally take into account speaker-dependent voice characteristics, the semantic content of the text data 115, and other context data when generating acoustic representations. In some implementations, the TTS system 100 may be configured to handle pauses that may be added and changed at will.

To configure the TTS system 100 to handle pause insertion and scaling, word boundary tokens that correspond to a pause exceeding a threshold may be randomly replaced with a pause embedding. For example, if a word boundary determined from the text data 115 corresponds to a pause greater than, for example, 8 frames or about 100 ms, the word boundary token may be randomly replaced with a pause token such as the one denoted "PAU". Thus, when the prosody prediction model 110 receives a pause token, it may predict a pause longer than the given threshold of 8 frames or whatever the threshold may be. The predicted pause may be long or short. But because the pause tokens are inserted into the first data 225 randomly, the prosody prediction model 110 won't necessarily predict a pause shorter than the threshold when there isn't a pause token. Thus, the prosody prediction model 110 may predict pauses for all word boundary tokens (e.g., denoted by "WB" in FIG. 3), where the pause reflects the time between the end of one word and the start of another. When the prosody prediction model 110 receives a pause token, however, it will insert the proper pause, which will be longer than the threshold. With the prosody prediction model 110 thusly trained, text data 115 for generating synthesized speech may be modified and/or annotated to include indications of pauses, which the prosody prediction model 110 will reproduce in its output. In addition, the prosody prediction model 110 may adapt the rest of the sentence based on that pause (e.g., by adapting other pauses in the sentence, cadence, emphasis, etc.). The prosody prediction model 110 may thus handle the insertion of pauses and adaption of sentences to inserted pauses without the use of an external and separately trained phrasing model.

Figure 5:
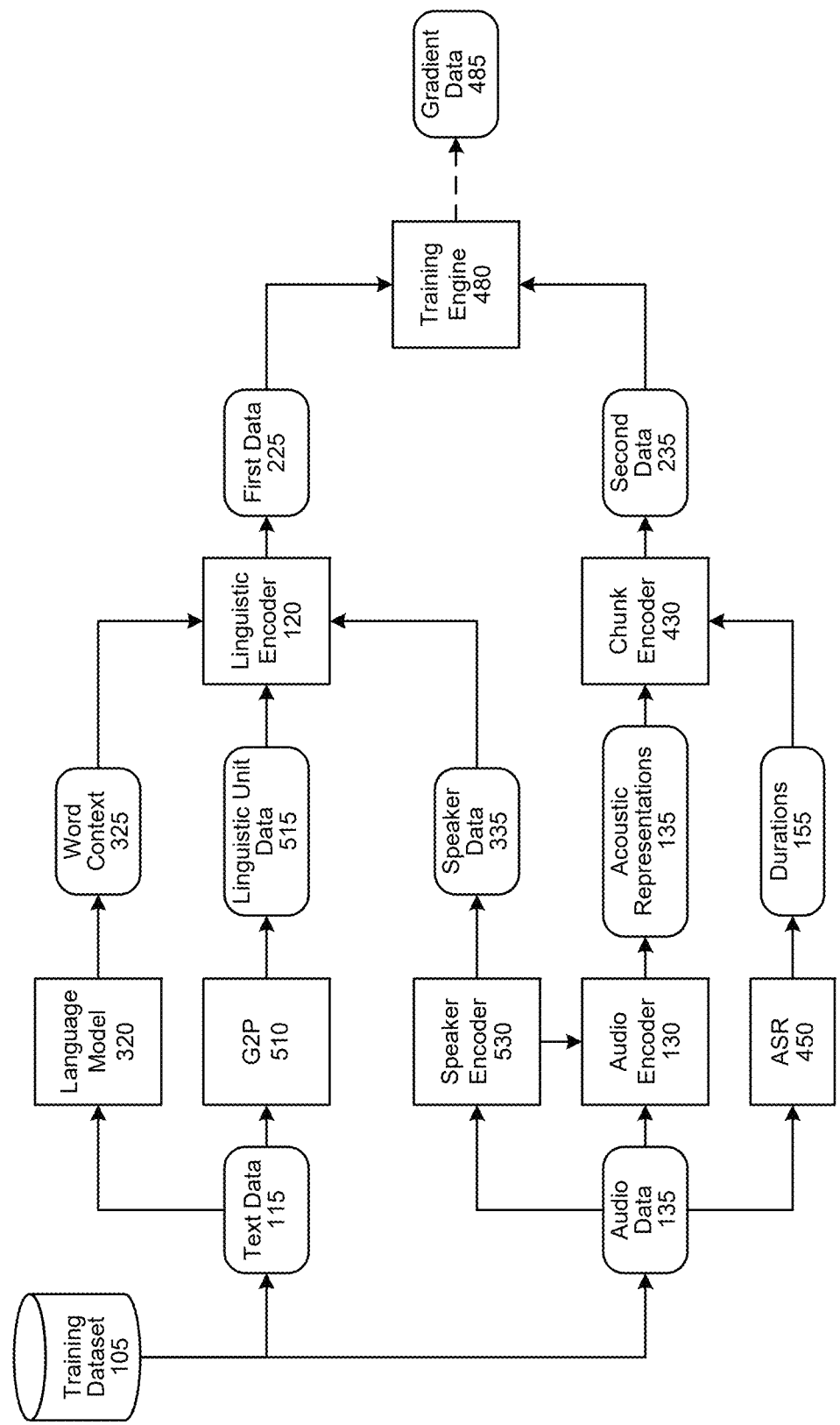
FIG. 5 illustrates example training operations of the linguistic encoder and audio encoder in additional detail, according to embodiments of the present disclosure.

In some implementations, the TTS system 100 may be trained to generate synthesized speech having prosodic characteristics that approximate those of a particular speaker. The TTS system 100 may be trained to use a speaker embedding (e.g., the speaker embedding data 335) as a conditioning input to one or more of the prosody prediction model 110, the audio encoder 130, and/or the linguistic encoder 120 (as shown in FIG. 5). The speaker embedding data 335 may be generated by a speaker encoder (e.g., such as the speaker encoder 530 described below with reference to FIG. 5). During inference, a speaker embedding data 335 may be included in the conditioning embedding data 107 provided to the linguistic encoder 120 and/or the prosody prediction model 110. In addition, the speaker embedding data 335 may be provided to the duration model 170 and/or the decoder 180 to generate synthesized speech that reflects a particular context and/or speaker-specific voice characteristics. The speaker embedding may be the same or different from the speaker embedding(s) used to train the TTS system 100. The speaker embedding data 335 may be used by the TTS system 100 as a conditioning using cross-attention by concatenation to the keys and values in the layers of the prosody prediction model 110 (e.g., transformer layers).

In some implementations, the TTS system 100 may process additional information; for example, contextualized word embeddings output by a language model 320 based on the text. The language model 320 may be, for example, a bidirectional encoder representations from transformers (BERT) model. In some implementations, the language model 320 may be a ROBERTa model (Robustly Optimized BERT Pretraining Approach). In some implementations, the language model 320 may be a generative pre-trained transformer such as GPT-3 or GPT-4. In various implementations, other language models may be used. The purpose of the language model 320 is to generate a contextualized word embedding (e.g., the word context data 325 denoted by "C" in FIG. 3). A contextualized word embedding may represent a semantic context of a word that takes into account its use in a particular sentence (e.g., in the context of the phrase, clause, sentence, etc., in which the word appears). For example, the contextualized word embedding may be useful in addressing polysemy by disambiguating words with multiple meanings, which may correspond to different pronunciations. The contextualized word embedding may be output as the word context data 325 (e.g., in the form of a vector, where a word may correspond to different vectors depending on its particular meaning and/or semantic context). The word context data 325 may convey to the linguistic encoder 120 and/or the prosody prediction model 110 information about how the word is used (e.g., which meaning of a word applies and whether other words in the sentence alter, modify, or qualify that meaning in a manner relevant to pronunciation). In some cases, the language model 320 may generate the word context data 325 based on text preceding or following a portion of text data 115 encoded by the linguistic encoder 120 and/or prosody prediction model 110. For example, when the linguistic encoder 120 and/or the prosody prediction model 110 process a sentence of text data 115 to generate synthesized speech, the word context data 325 may represent context derived from one or more additional sentences preceding the sentence and/or one or more additional sentences following the sentence. In this manner, the linguistic encoder 120 and/or the prosody prediction model 110 may generate outputs that represent context from beyond the sentence.

The word context data 325 may be used as a conditioning input for the linguistic encoder 120 and/or the prosody prediction model 110 during training. The word context data 325 may also be generated by the language model 320 at inference for the purpose of generating synthesized speech, and used by the linguistic encoder 120 and/or the prosody prediction model 110 when processing the text data 115. The TTS system 100 may thus predict acoustic representations and/or duration data that may be processed by the decoder 180 to generate the audio data 195.

In some implementations, the TTS system 100 may receive additional context data 315 from beyond the sentence (e.g., previous parts of the conversation with the user and/or data related to the user, the user device, the source of the text, etc.) which may be used as a further conditioning input to the linguistic encoder 120, audio encoder 130, and/or the prosody prediction model 110 during training and/or inference. In some implementations, the additional context data 315 may be provided to the duration model 170 and/or the decoder 180 as well.

Figure 4:
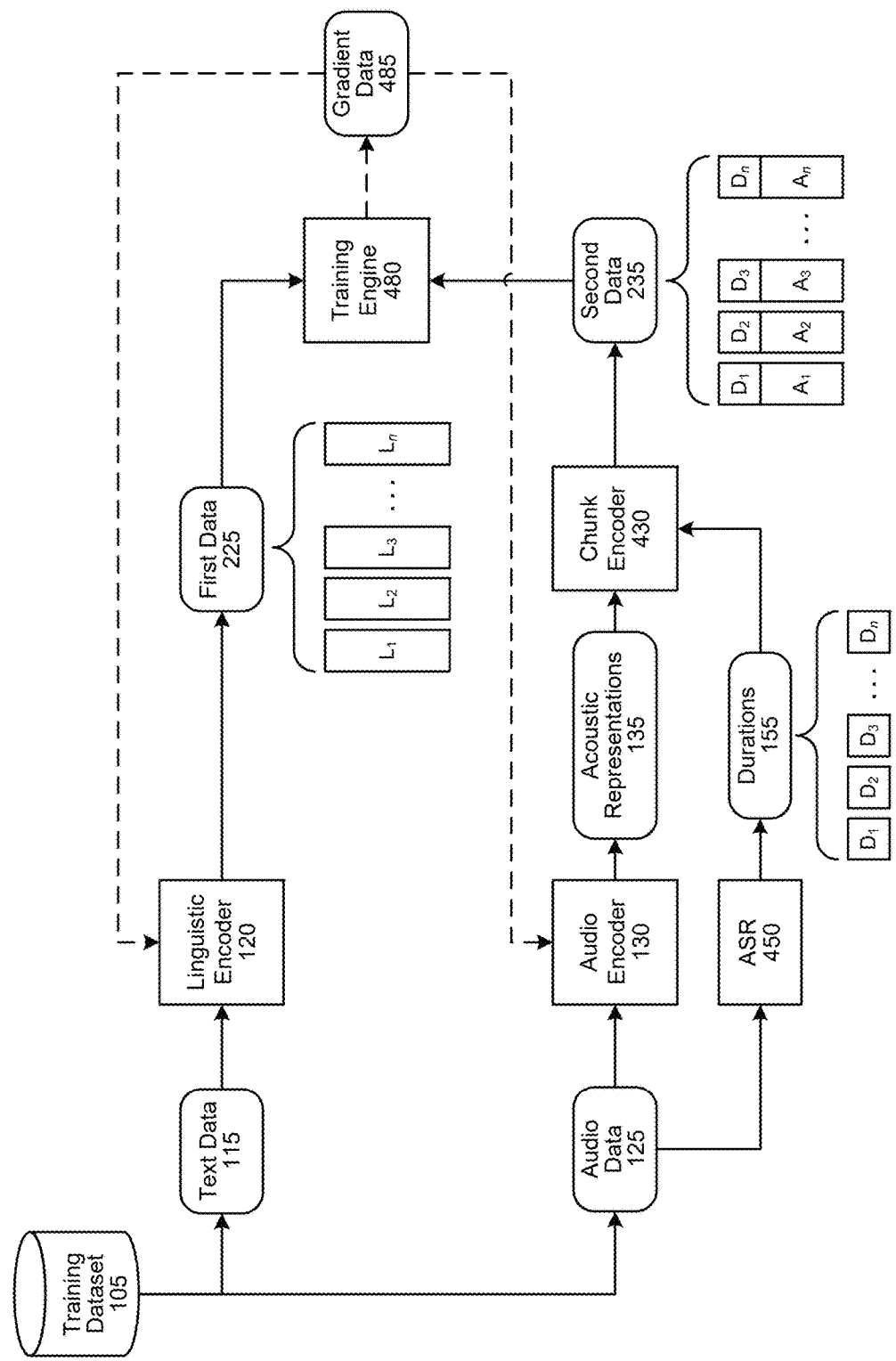
FIG. 4 is a conceptual diagram illustrating example operations for training a linguistic encoder of the TTS system, according to embodiments of the present disclosure.

FIG. 4 is a conceptual diagram illustrating example operations for training a linguistic encoder 120 of the TTS system 100, according to embodiments of the present disclosure. The encoders may be trained to encode text data 115 and audio data 125 representing samples of speech in a training dataset 105 to a shared representational space.

In the linguistic path, the linguistic encoder 120 may process the text data 115 to generate the first data 225. The first data 225 may include linguistic representations $L_1$, $L_2$, ... $L_n$ where a linguistic representation $L_i$ corresponds to a linguistic unit in the text data 115.

In the audio path, the audio encoder 130 may encode the audio data 125 as acoustic representations 135. The audio data 125 may include, for example, reference mel-spectrograms representing recoded samples of speech that correspond to the text data 115. In some implementations, another component such as an ASR component 450 may process the audio data 125 and determine the duration data 155. The duration data 155 (e.g., the durations $D_1$, $D_2$, ... $D_n$) may represent the duration of linguistic units recognized in the audio data as expressed in, for example, a number of audio frames, fractions of a second, or some other measure of time. A chunk encoder 430 may use the duration data 155 to downsample the acoustic representations 135 to the linguistic level (e.g., one acoustic representation vector per phoneme) and concatenate the downsampled acoustic representations 135 with the duration data 155. The chunk encoder 430 may output the second data 235 representing the downsampled and concatenated acoustic representations 135 and duration data 155. Thus, the second data 235 may be in the form of $A_1, D_1; A_2, D_2; \ldots A_n, D_n$ as shown in FIG. 4.

A training engine 480 may compare the first data 225 and the second data 235 to determine error data. Based on discrepancies in the output sequence from the input sequence as reflected in the error data, the training engine 480 may calculate gradient data 485 which it may then backpropagate through the linguistic encoder 120 and/or the audio encoder 130 to update the parameters therein. The linguistic encoder 120 and the audio encoder 130 may be trained to encode the text data 115 and audio data 125, respectively, into a shared representational space. The error data may be a loss calculated using cosine similarity, mean squared error (MSE), sum of squared error (SSE), hinge, cross-entropy, and/or other loss function. For example, training engine 480 may update the linguistic encoder 120 and the audio encoder 130 to maximize the cosine similarity between the first data 225 and the second data 235, and to minimize the cosine similarity with data encoded from other samples in the training dataset 105. This training may cause both encoders to represent their respective input sequence in a compressed representation while keeping the representations separable. Thus, the audio encoder 130 may capture details of the audio data 125 that are predictable by the linguistic encoder 120 based on the corresponding text data 115, and vice versa. The training engine 480 may calculate gradient data 485 which it may then backpropagate through the linguistic encoder 120 and the audio encoder 130 to update the parameters of each. Once trained, the linguistic encoder 120 and the audio encoder 130 may be used to generate a training dataset 205 for training the prosody prediction model 110 as described below with reference to FIG. 6, and the linguistic encoder 120 may be used to encode linguistic representations 145 that the prosody prediction model 110 may use to generate synthesized speech as described above with reference to FIG. 1.

FIG. 5 illustrates example training operations of the linguistic encoder 120 and audio encoder 130 in additional detail, according to embodiments of the present disclosure. In some implementations, the linguistic encoder 120 may process word context data 325 from the language model 320 as described previously with reference to FIG. 3. In some implementations, a grapheme-to-phoneme conversion (G2P) may be used to generate pronunciation information for words based on their written form. The G2P component 510 may convert the text data 115 to linguistic unit data 515. The linguistic unit data 515 may include tokens representing phonemes, syllables, subwords, words, and/or other linguistic units corresponding to the text data 115. In some implementations, the G2P component 510 may include a data structure such as a lookup table that identifies one or more linguistic units corresponding to a particular word. In some implementations, the G2P component 510 may include a neural network or other machine learning architecture that may convert words to linguistic units in a way that reflects context (e.g., to disambiguate homographs). In some implementations, the G2P component may include a language model (e.g., such as the language model 320) that may generate additional information based on the text data 115 such as a token, embedding, or other data that includes semantic and/or grammatical information about a word, or otherwise disambiguates the word from potential homographs. The length of the linguistic units may correspond to the output of the language model 320 (e.g., such that linguistic units of the linguistic unit data 515 align with word embeddings of the word context data 325). In some implementations, the G2P component 510 may include additional intelligence such as a trained model that can output linguistic unit data 515 that accounts for different pronunciations of a word based on context (e.g., adjacent words, punctuation, and/or whether the word is used in a statement, question, exclamation, etc.). The resulting linguistic unit data 515 may be provided to the linguistic encoder 120. The linguistic encoder 120 may process the linguistic unit data 515 to generate the first data 225.

In some implementations, the TTS system 100 may be trained to generate synthesized speech having prosodic characteristics that approximate those of a particular speaker. The TTS system 100 may include a speaker encoder 530 configured to process the audio data 125 and generate a speaker embedding (e.g., the speaker embedding data 335). The speaker encoder 530 may be trained such that the speaker embedding data 335 exhibits little variation for different speech samples from the same speaker, but which varies to a greater degree for speech of different speakers. The speaker encoder 530 may be, for example, a neural network encoder trained for a speaker identification task. The speaker encoder 530 may be trained with samples of speech from many speakers. In some implementations, the speaker embedding data 335 may represent a classification of the audio data 125 to a particular speaker identifier. In some implementations, the speaker embedding data 335 may represent a speaker embedding that correlates to the speaker identifier. The speaker embedding data 335 may be used for training the linguistic encoder 120, audio encoder 130, and/or the prosody prediction model 110. The speaker embedding data 335 may also be used during inference as a conditioning input to the linguistic encoder 120 (and/or the prosody prediction model 110) to cause the TTS system 100 to generate synthesized speech having certain voice characteristics. The speaker embedding represented by the speaker embedding data 335 used during inference may be the same or different from the speaker embedding(s) used to train the TTS system 100.

The audio path in FIG. 5 is similar to that described above with reference to FIG. 4. The audio encoder 130 may encode the audio data 125 as acoustic representations 135. The ASR component 450 may process the audio data 125 to determine the duration data 155. The chunk encoder 430 may combine the acoustic representations 135 and duration data 155 to generate the second data 235 (e.g., by downsampling the acoustic representations 135 to the linguistic unit level and concatenating with the duration data 155).

FIG. 6 illustrates example operations for using the linguistic encoder 120 and audio encoder 130 to generate a training dataset for the prosody prediction model 110, according to embodiments of the present disclosure. The linguistic encoder 120 and audio encoder 130 may generate the training dataset 205 for the prosody prediction model 110 using speech samples in the training dataset 105. The training dataset 105 may include audio data 125 representing recordings of speech and text data 115 representing transcripts of that speech. As described previously, a G2P component 510 may convert the text data 115 to linguistic unit data 515 that represents the pronunciation of speech represented by the text data 115. The linguistic encoder 120 may process the linguistic unit data 515 to generate the first data 225. The first data 225 may include linguistic representations 145.

The audio encoder 130 may process the audio data 125 to generate the acoustic representations 135. An ASR component 450 may determine duration data 155 from the audio data 125. In some implementations, the ASR component 450 may be a simplified speech recognition component that may identify a frame number of the audio data 125 where a linguistic unit (e.g., phoneme or word) begins and a frame number of the audio data 125 where a phoneme or word ends. The duration data 155 may be expressed as a number of frames (e.g., of audio data), milliseconds, or some of the measure related to time. The chunk encoder 430 may use the duration data 155 to downsample the acoustic representations 135 to the linguistic level (e.g., one acoustic representation vector per phoneme) and combine the downsampled acoustic representations 135 with the duration data 155 to generate the second data 235. The first data 225 and the second data 235 may be included in the training dataset 205. A training engine 280 may train the prosody prediction model 110 using the training dataset 205 as described previously with reference to FIGS. 2 and 3. In some implementations, the conditioning embedding data 107 (e.g., including speaker embedding data 335, additional context data 315, word context data 325, etc.) may be used to generate the training dataset 205 and/or train the prosody prediction model 110. The conditioning embedding data 107 may be processed by the linguistic encoder 120 and/or audio encoder 130 as described with reference to FIGS. 3 and 5, and/or processed by the prosody prediction model 110 as described with reference to FIG. 3.

The TTS system 100 may be a part of a natural language command processing system 700 and shown in FIG. 7A. The system 700 may operate using various components as described in FIG. 7A. The various components may be located on same or different physical devices. Communication between various components may occur directly or across a network(s) 199. A user 5 may interact with a user device 710 using a combination of inputs and outputs including voice, text, and/or images. The device 710 may include audio capture component(s), such as a microphone 820 or array of microphones of a device 710. The microphone(s) 820 may capture audio 11 and provide the audio signal to an acoustic front end (AFE) 722, which may create corresponding audio data 711. Once speech is detected in the audio data 711, the device 710 may determine if the speech is directed to the user device 710 and/or system component(s) 720. In at least some embodiments, such determination may be made using a wakeword detection component 726. The wakeword detection component 726 may be configured to detect various wakewords. In at least some examples, each wakeword may correspond to a name of a different digital assistant. An example wakeword/digital assistant name is "Alexa." In another example, input to the system may be in form of text data 13, for example as a result of a user typing an input into a user interface of device 710. Other input forms may include indication that the user has pressed a physical or virtual button on device 710, the user has made a gesture, etc. The device 710 may also capture image data 15 using camera(s) 818 of the device 710 and may send image data 15 representing those image(s) to the system component(s). The image data 15 may include raw image data or image data processed by the device 710 before sending to the system component(s). The image data 15 may be used in various manners by different components of the system to perform operations such as determining whether a user is directing an utterance to the system, interpreting a user command, responding to a user command, etc.

The wakeword detection component 726 of the device 710 may process the audio data 711, representing the audio 11, to determine whether speech is represented therein. The device 710 may use various techniques to determine whether the audio data includes speech. In some examples, the device 710 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 710 may implement a classifier configured to distinguish speech from background noise. The classifier may be implemented by techniques such as linear classifiers, support vector machines, and decision trees. In still other examples, the device 710 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 726 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 726 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 726 and/or input is detected by an input detector, the device 710 may "wake" and begin transmitting audio data 711, representing the audio 11, to the system component(s) 720. The audio data 711 may include data corresponding to the wakeword; in other embodiments, the portion of the audio corresponding to the wakeword is removed by the device 710 prior to sending the audio data 711 to the system component(s) 720. In the case of touch input detection or gesture based input detection, the audio data may not include a wakeword.

In some implementations, the system 700 may include more than one system component(s). The system component(s) 720 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 726 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 790a, 790b, 790c, etc. (collectively "skill components 790") of one or more system component(s) 720.

Upon receipt by the system component(s) 720, the audio data 711 may be sent to an skill component(s) 790 730. The skill component(s) 790 730 may include memory and logic that enables the skill component(s) 790 730 to transmit various pieces and forms of data to various components of the system, as well as perform other operations as described herein.

The skill component(s) 790 730 may send the audio data 711 to language processing components 792. The language processing components 792 (sometimes also referred to as a spoken language understanding (SLU) component) includes an automatic speech recognition (ASR) component 450 and a natural language understanding (NLU) component 760. The ASR component 450 may transcribe the audio data 711 into text data. The text data output by the ASR component 450 represents one or more than one (e.g., in the form of an N-best list) ASR hypotheses representing speech represented in the audio data 711. The ASR component 450 interprets the speech in the audio data 711 based on a similarity between the audio data 711 and pre-established language models. For example, the ASR component 450 may compare the audio data 711 with models for sounds (e.g., acoustic units such as phonemes, senons, phones, etc.) and sequences of sounds to identify words that match the sequence of sounds of the speech represented in the audio data 711. The ASR component 450 sends the text data generated thereby to an NLU component 760, via, in some embodiments, the skill component(s) 790 730. The text data sent from the ASR component 450 to the NLU component 760 may include a single top-scoring ASR hypothesis or may include an N-best list including multiple top-scoring ASR hypotheses. An N-best list may additionally include a respective score associated with each ASR hypothesis represented therein.

The language processing components 792 may further include a NLU component 760. The NLU component 760 may receive the text data from the ASR component. The NLU component 760 may attempts to make a semantic interpretation of the phrase(s) or statement(s) represented in the text data input therein by determining one or more meanings associated with the phrase(s) or statement(s) represented in the text data. The NLU component 760 may determine an intent representing an action that a user desires be performed and may determine information that allows a device (e.g., the device 710, the system component(s) 720, a skill component 790, a skill system component(s) 725, etc.) to execute the intent. For example, if the text data corresponds to "play the 5$^{th}$ Symphony by Beethoven," the NLU component 760 may determine an intent that the system output music and may identify "Beethoven" as an artist/composer and "5th Symphony" as the piece of music to be played. For further example, if the text data corresponds to "what is the weather," the NLU component 760 may determine an intent that the system output weather information associated with a geographic location of the device 710. In another example, if the text data corresponds to "turn off the lights," the NLU component 760 may determine an intent that the system turn off lights associated with the device 710 or the user 5. However, if the NLU component 760 is unable to resolve the entity—for example, because the entity is referred to by anaphora such as "this song" or "my next appointment"—the language processing components 792 can send a decode request other language processing components for information regarding the entity mention and/or other context related to the utterance. The language processing components 792 may augment, correct, or base results data upon the audio data 711 as well as any data received from the other language processing components.

The NLU component 760 may return NLU results data (which may include tagged text data, indicators of intent, etc.) back to the orchestration component 730. The orchestration component 730 may forward the NLU results data to a skill component(s) 790. If the NLU results data includes a single NLU hypothesis, the NLU component 760 and the skill component(s) 790 730 may direct the NLU results data to the skill component(s) 790 associated with the NLU hypothesis. If the NLU results data includes an N-best list of NLU hypotheses, the NLU component 760 and the skill component(s) 790 730 may direct the top scoring NLU hypothesis to a skill component(s) 790 associated with the top scoring NLU hypothesis. The system may also include a post-NLU ranker which may incorporate other information to rank potential interpretations determined by the NLU component 760.

A skill component may be software running on the system component(s) 720 that is akin to a software application. That is, a skill component 790 may enable the system component(s) 720 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 720 may be configured with more than one skill component 790. For example, a weather service skill component may enable the system component(s) 720 to provide weather information, a car service skill component may enable the system component(s) 720 to book a trip with respect to a taxi or ride sharing service, a restaurant skill component may enable the system component(s) 720 to order a pizza with respect to the restaurant's online ordering system, etc. A skill component 790 may operate in conjunction between the system component(s) 720 and other devices, such as the device 710, in order to complete certain functions. Inputs to a skill component 790 may come from speech processing interactions or through other interactions or input sources. A skill component 790 may include hardware, software, firmware, or the like that may be dedicated to a particular skill component 790 or shared among different skill components 790.

A skill system component(s) 725 may communicate with a skill component(s) 790 within the system component(s) 720 and/or directly with the skill component(s) 790 730 or with other components. A skill system component(s) 725 may be configured to perform one or more actions. An ability to perform such action(s) may sometimes be referred to as a "skill." That is, a skill may enable a skill system component(s) 725 to execute specific functionality in order to provide data or perform some other action requested by a user. For example, a weather service skill may enable a skill system component(s) 725 to provide weather information to the system component(s) 720, a car service skill may enable a skill system component(s) 725 to book a trip with respect to a taxi or ride sharing service, an order pizza skill may enable a skill system component(s) 725 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system component(s) 720 may be configured with a skill component 790 dedicated to interacting with the skill system component(s) 725. Unless expressly stated otherwise, reference to a skill, skill device, or skill component may include a skill component 790 operated by the system component(s) 720 and/or skill operated by the skill system component(s) 725. Moreover, the functionality described herein as a skill or skill may be referred to using many different terms, such as an action, bot, app, or the like. The skill component 790 and or skill system component(s) 725 may return output data to the orchestration component 730.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 700 may include a dialog manager 772 that manages and/or tracks a dialog between a user and a device. As used herein, a "dialog" may refer to multiple related user inputs and system 700 outputs (e.g., through device(s) 710) between the system and the user that may have originated with a single user input initiating the dialog. Thus, the data associated with a dialog may be associated with a same dialog identifier, which may be used by components of the overall system 700 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 700 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager 772 may associate a dialog session identifier with the dialog upon identifying that the user is engaging in a dialog with the user. The dialog manager 772 may track a user input and the corresponding system generated response to the user input as a turn. The dialog session identifier may correspond to multiple turns of user input and corresponding system generated response. The dialog manager 772 may transmit data identified by the dialog session identifier directly to the skill component(s) 790 730 or another component. Depending on system configuration the dialog manager 772 may determine the appropriate system generated response to give to a particular utterance or user input of a turn. Or creation of the system-generated response may be managed by another component of the system (e.g., the language output components 793, NLG component 779, orchestration component 730, etc.) while the dialog manager 772 selects the appropriate responses. Alternatively, another component of the system component(s) 720 may select responses using techniques discussed herein. The text of a system generated response may be sent to the TTS system 100 for creation of audio data corresponding to the response. The audio data may then be sent to a user device (e.g., device 710) for ultimate output to the user. Alternatively (or in addition) a dialog response may be returned in text or some other form.

The dialog manager 772 may receive the ASR hypothesis/hypotheses (i.e., text data) and make a semantic interpretation of the phrase(s) or statement(s) represented therein. That is, the dialog manager 772 determines one or more meanings associated with the phrase(s) or statement(s) represented in the text data based on words represented in the text data. The dialog manager 772 determines a goal corresponding to an action that a user desires be performed as well as pieces of the text data that allow a device (e.g., the device 710, the system component(s) 720, a skill component 790, a skill system component(s) 725, etc.) to execute the intent. If, for example, the text data corresponds to "what is the weather," the dialog manager 772 may determine that that the system component(s) 720 is to output weather information associated with a geographic location of the device 710. In another example, if the text data corresponds to "turn off the lights," the dialog manager 772 may determine that the system component(s) 720 is to turn off lights associated with the device(s) 710 or the user(s) 5.

The dialog manager 772 may send the results data to one or more skill component(s) 790. If the results data includes a single hypothesis, the skill component(s) 790 730 may send the results data to the skill component(s) 790 associated with the hypothesis. If the results data includes an N-best list of hypotheses, the skill component(s) 790 730 may send the top scoring hypothesis to a skill component(s) 790 associated with the top scoring hypothesis.

The system component(s) includes language output components 793. The language output components 793 may include a natural language generation (NLG) component 779 and/or the dialog manager 772. In some implementations, the language output components 793 may include a TTS component (e.g., such as the TTS system 100 described herein). In other implementations, the TTS system 100 may be separate from the language output components 793 (e.g., executing as separate software routines on different hardware). The NLG component 779 can generate text for purposes of TTS output to a user. For example, the NLG component 779 may generate text corresponding to instructions corresponding to a particular action for the user to perform. The NLG component 779 may generate appropriate text for various outputs as described herein. The NLG component 779 may include one or more trained models configured to output text appropriate for a particular input. The text output by the NLG component 779 may become input for the TTS system 100 (e.g., text data 115). Alternatively or in addition, the TTS system 100 may receive the text data from a skill component 790 or other system component for output. For example, a user device 710 may receive content for generating synthesized speech from a system component 720 and/or a skill support system component 725 separate from the user device 710. The TTS system 100 may operate on the user device 710 to process the content to generate synthesized speech.

The NLG component 779 may include a trained model. The NLG component 779 may generate text data 115 from dialog data received by the dialog manager 772 such that the text data has a natural feel and, in some embodiments, includes words and/or phrases specifically formatted for a requesting individual. The NLG may use templates to formulate responses. And/or the NLG system may include models trained from the various templates for forming the output text data 115. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using a text-to-speech component such as the TTS system 100.

The TTS system 100 may generate audio data 195 (e.g., synthesized speech) from the text data 115 using the techniques discussed above. The text data 115 input to the TTS system 100 may represent content from, for example, a skill component 790, the NLG component 779, dialog manager 772, the skill component(s) 790, orchestrator component 730, and/or another component of the system 700. The text data 115 may represent content in any spoken and/or written natural language. The TTS system 100 may process the text data 115 using the linguistic encoder 120, the prosody prediction model 110, and the decoder 180. In some implementations, the TTS system 100 may include a duration model 170 as shown in FIGS. 1 and 3 for encoding duration predictions output by the prosody prediction model 110 for use by the decoder 180. The output of the decoder 180 may be in the form of mel-spectrograms or wave files. In some implementations, the TTS system 100 may include additional components for converting the output of the prosody prediction model 110 into audio data representing the synthesized speech which may then be output to the user by a speaker of the user device 710.

In some implementations, the TTS system 100 may reside (e.g., execute) on a user device 710.

The system 700 (either on device 710, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 770 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 710, the user profile (associated with the presented login information) may be updated to include information about the device 710, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 770 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 770 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 7B:
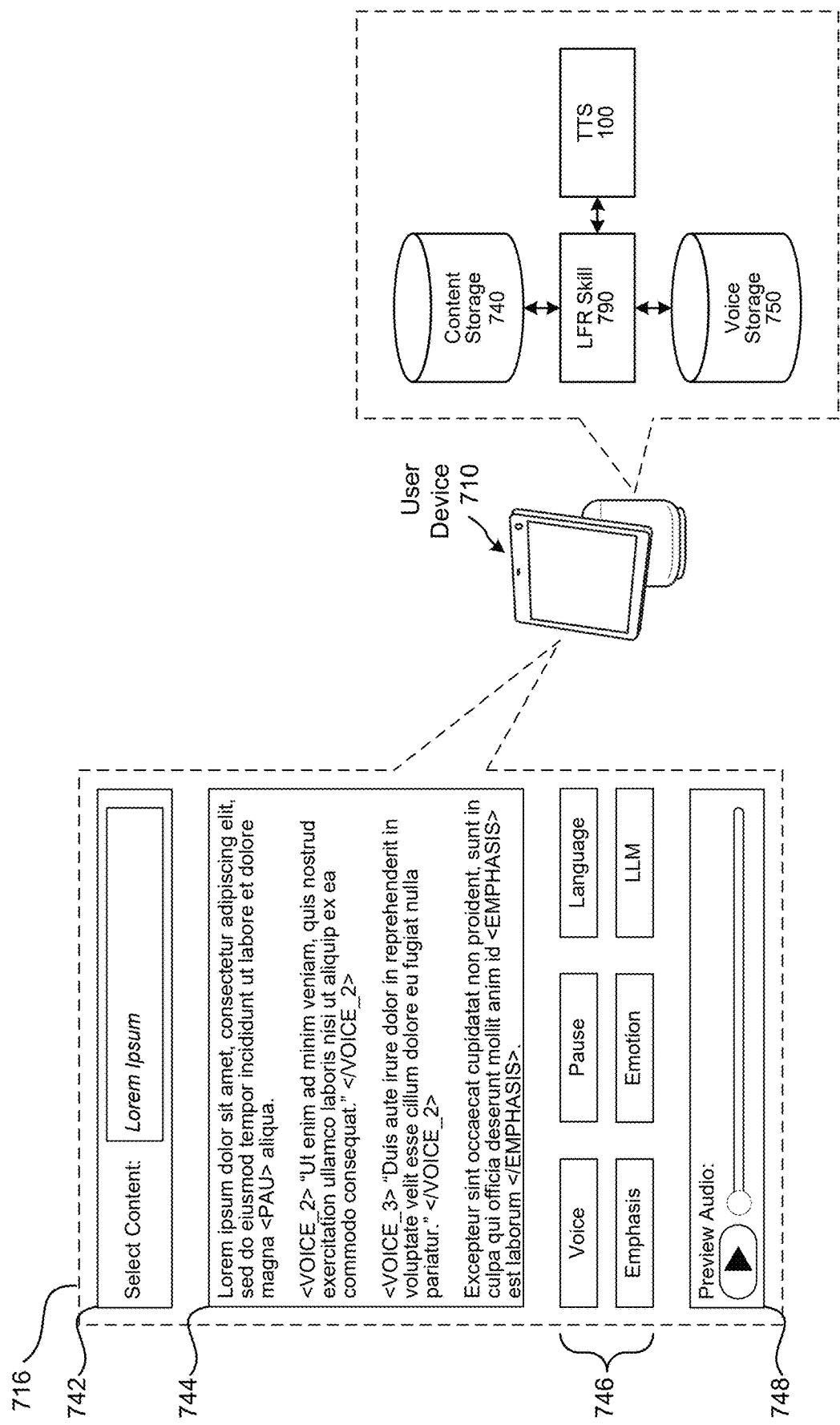
FIG. 7B illustrates an example user interface for editing long-form content for the generation of synthesized speech, according to embodiments of the present disclosure.
Figure 8:
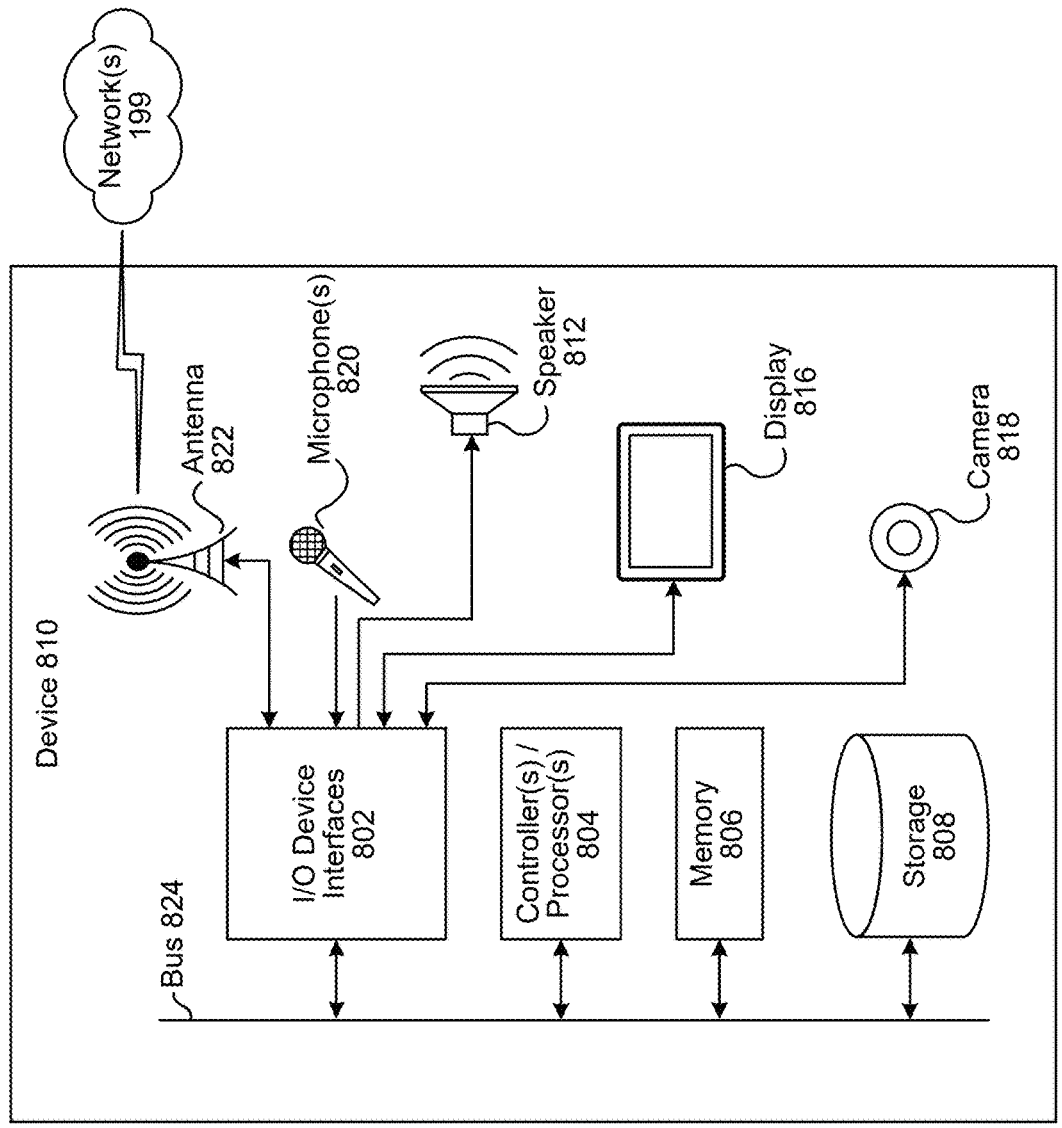
FIG. 8 is a block diagram conceptually illustrating example components of a device, according to embodiments of the present disclosure.

FIG. 7B illustrates an example user interface 716 for editing long-form content for the generation of synthesized speech, according to embodiments of the present disclosure. The user interface 716 may be displayed on a display of a user device 710 (e.g., a display 816 as shown in FIG. 8). In some implementations, the display 816 may be a touchscreen. In some implementations, a user may interact with the user interface 716 via a keyboard and/or mouse, etc., in addition (or alternatively) to a touchscreen. The user device 710 (alone and/or in conjunction with one or more system components 720 and/or skill support system components 725) may include a long form reading skill executing on a skill component 790. The LFR skill may allow a user to generate synthesized speech based on content. The content may be, for example, an e-book. The LFR skill may enable the user to generate an audio book from the e-book using synthesized speech (e.g., without requiring the user or voice actor to record a reading of the book). Other types of content may be used, such as generating synthesized speech from closed captions and/or subtitles accompanying video, messages or notifications, news articles, sports commentary, song lyrics, etc. The LFR skill may provide an editor that allows the user to control various aspects of speech generation including selecting the output language and voice as well as manually control aspects of pronunciation by, for example, inserting and/or modifying pauses, emphasis, etc.

The user interface 716 may include various elements including a first box 742 for selecting content. The user may input (e.g., upload) and/or select content using the first box 742 by, for example, selecting a title, filename, etc., of the content. The LFR skill component 790 may retrieve the selected content from a content storage component 740. In other cases, the user may upload the content directly to the LFR skill component 790. A second box 744 may show the selected content in text form. Using various buttons 746, the user may select a voice (e.g., voice characteristics) for the synthesized speech. In some implementations, the user may select different voices for different portions of the content (e.g., <VOICE_1> as the default voice for the content, <VOICE_2> for a first quotation, <VOICE_3> for a second quotation, etc.). The LFR skill component 790 may retrieve voice characteristics corresponding to the selected voice(s) from a voice storage component 750. In some implementations, the user may upload voice samples, and an encoder of the system may generate a speaker embedding which the TTS system 100 may use to generate synthesized speech having the desired voice characteristics. The user may insert a pause (e.g., signified with a <PAU>token) in the content. In some implementations, the user interface 716 may allow the user to manually adjust the pause length. The user interface 716 may allow the user to manually add emphasis to a particular syllable, word, phrase etc., (e.g., using emphasis tokens <EMPHASIS>, </EMPHASIS> around the text to be emphasized). The user interface 716 may allow the user to implement a language model (e.g., via a large language model "LLM" button 746) to generate contextualized word embeddings. The TTS system 100 may use the contextualized word embeddings to generate synthesized speech in which words are pronounced correctly for the given context.

At any time, the user may preview synthesized speech generated from the content using the third box 748. The user may preview the content from the beginning or select a portion of the content (e.g., by selecting text/tokens in the second box 744). The LRF skill component 790 may send the annotated content to the TTS system 100, which may generate the synthesized speech preview. If so desired, the user may adjust annotation of the content by repeating various operations described above. When editing of the content is complete, the LFR skill may store the annotated/edited content in the content storage component 740 for later use. For example, the LFR skill (and/or a different skill) may retrieve the content for use by a second user (e.g., to listen to the audio book). In some implementations, the LFR skill may allow the second user to modify aspects of the content to personalize delivery. For example, the LFR skill may allow the second user to adjust the language or voice(s) selected for the content. Other aspects of the content such as emphasis and/or pauses applied by the first user may still be reproduced by the TTS system 100.

Figure 9:
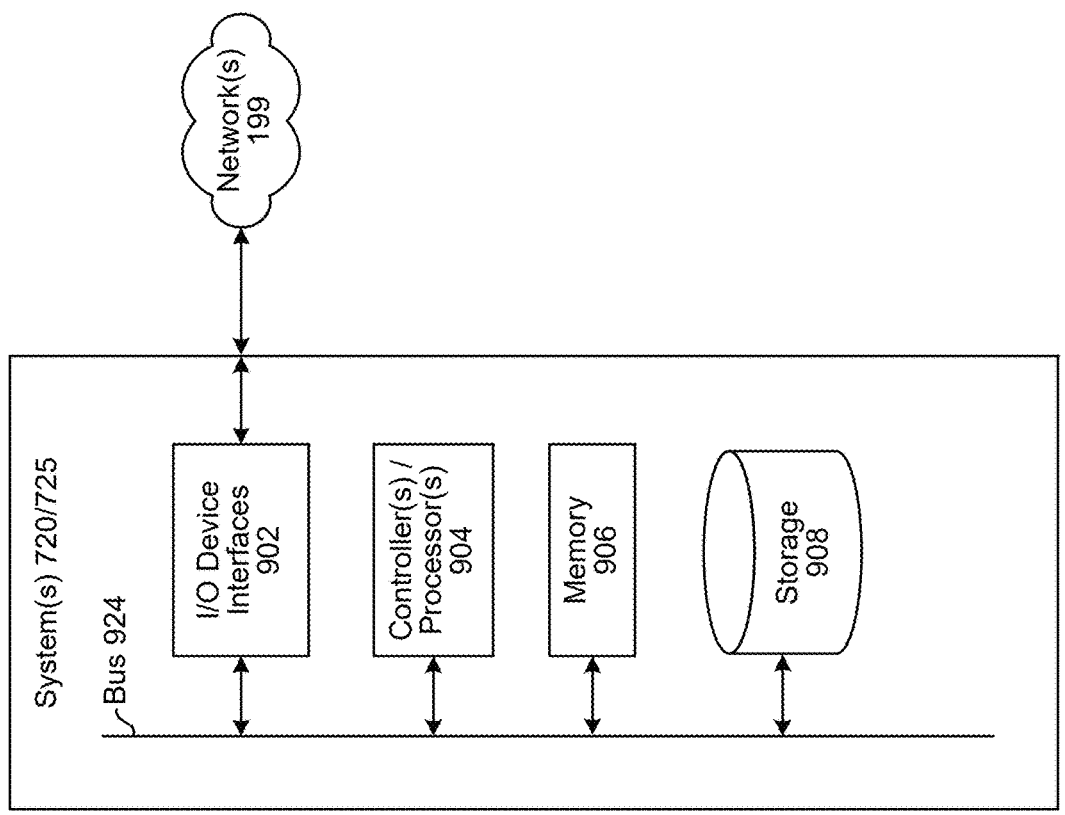
FIG. 9 is a block diagram conceptually illustrating example components of a system, according to embodiments of the present disclosure.

FIG. 8 is a block diagram conceptually illustrating a device 710 that may be used with the system. FIG. 9 is a block diagram conceptually illustrating example components of a remote device, such as the natural language command processing system component(s), which may assist with ASR processing, NLU processing, etc., and a skill system component(s) 725. A system (720/725) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 710 may operate locally to a user (e.g., within a same environment so the device may receive inputs and playback outputs for the user) the server/system component(s) may be located remotely from the device 710 as its operations may not require proximity to the user. The server/system component(s) may be located in an entirely different location from the device 710 (for example, as part of a cloud computing system or the like) or may be located in a same environment as the device 710 but physically separated therefrom (for example a home server or similar device that resides in a user's home or business but perhaps in a closet, basement, attic, or the like). The system component(s) 720 may also be a version of a user device 710 that includes different (e.g., more) processing capabilities than other user device(s) 710 in a home/office. One benefit to the server/system component(s) being in a user's home/business is that data used to process a command/return a response may be kept within the user's home, thus reducing potential privacy concerns.

Multiple system components (720/725) may be included in the overall system 700 of the present disclosure, such as one or more natural language processing system component(s) 720 for performing ASR processing, one or more natural language processing system component(s) 720 for performing NLU processing, one or more skill system component(s) 725, etc. In operation, each of these systems may include computer-readable and computer-executable instructions that reside on the respective device (720/725), as will be discussed further below.

Each of these devices (710/720/725) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (710/720/725) may also include a data storage component (808/908) for storing data and controller/processor-executable instructions. Each data storage component (808/908) may individually include one or more non-volatile storage types such as magnetic storage, optical storage, solid-state storage, etc. Each device (710/720/725) may also be connected to removable or external non-volatile memory and/or storage (such as a removable memory card, memory key drive, networked storage, etc.) through respective input/output device interfaces (802/902).

Computer instructions for operating each device (710/720/725) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (710/720/725) includes input/output device interfaces (802/902). A variety of components may be connected through the input/output device interfaces (802/902), as will be discussed further below. Additionally, each device (710/720/725) may include an address/data bus (824/924) for conveying data among components of the respective device. Each component within a device (710/720/725) may also be directly connected to other components in addition to (or instead of) being connected to other components across the bus (824/924).

Referring to FIG. 8, the device 710 may include input/output device interfaces 802 that connect to a variety of components such as an audio output component such as a speaker 812, a wired headset or a wireless headset (not illustrated), or other component capable of outputting audio. The device 710 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 710 may additionally include a display 816 for displaying content. The device 710 may further include a camera 818.

Via antenna(s) 822, the input/output device interfaces (802/902) may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 710, the natural language command processing system component(s), or a skill system component(s) 725 may include their own dedicated processors, memory, and/or storage. Alternatively, one or more of the components of the device(s) 710, the natural language command processing system component(s), or a skill system component(s) 725 may utilize the I/O interfaces (802/902), processor(s) (804/904), memory (806/906), and/or storage (808/908) of the device(s) 710, natural language command processing system component(s), or the skill system component(s) 725, respectively. Thus, the ASR component 450 may have its own I/O interface(s), processor(s), memory, and/or storage; the NLU component 760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 710, the natural language command processing system component(s), and a skill system component(s) 725, as described herein, are illustrative, and may be located as a stand-alone device or may be included, in whole or in part, as a component of a larger device or system. As can be appreciated, a number of components may exist either on a system component(s) and/or on device 710. For example, the language processing components 792 (which may include the ASR component 450 and/or the NLU component 760), language output components 793 (which may include the NLG component 779 and/or the dialog manager 772), etc., for example as illustrated in FIG. 7A. Unless expressly noted otherwise, the system version of such components may operate similarly to the device version of such components and thus the description of one version (e.g., the system version or the local version) applies to the description of the other version (e.g., the local version or system version) and vice-versa.

Figure 10:
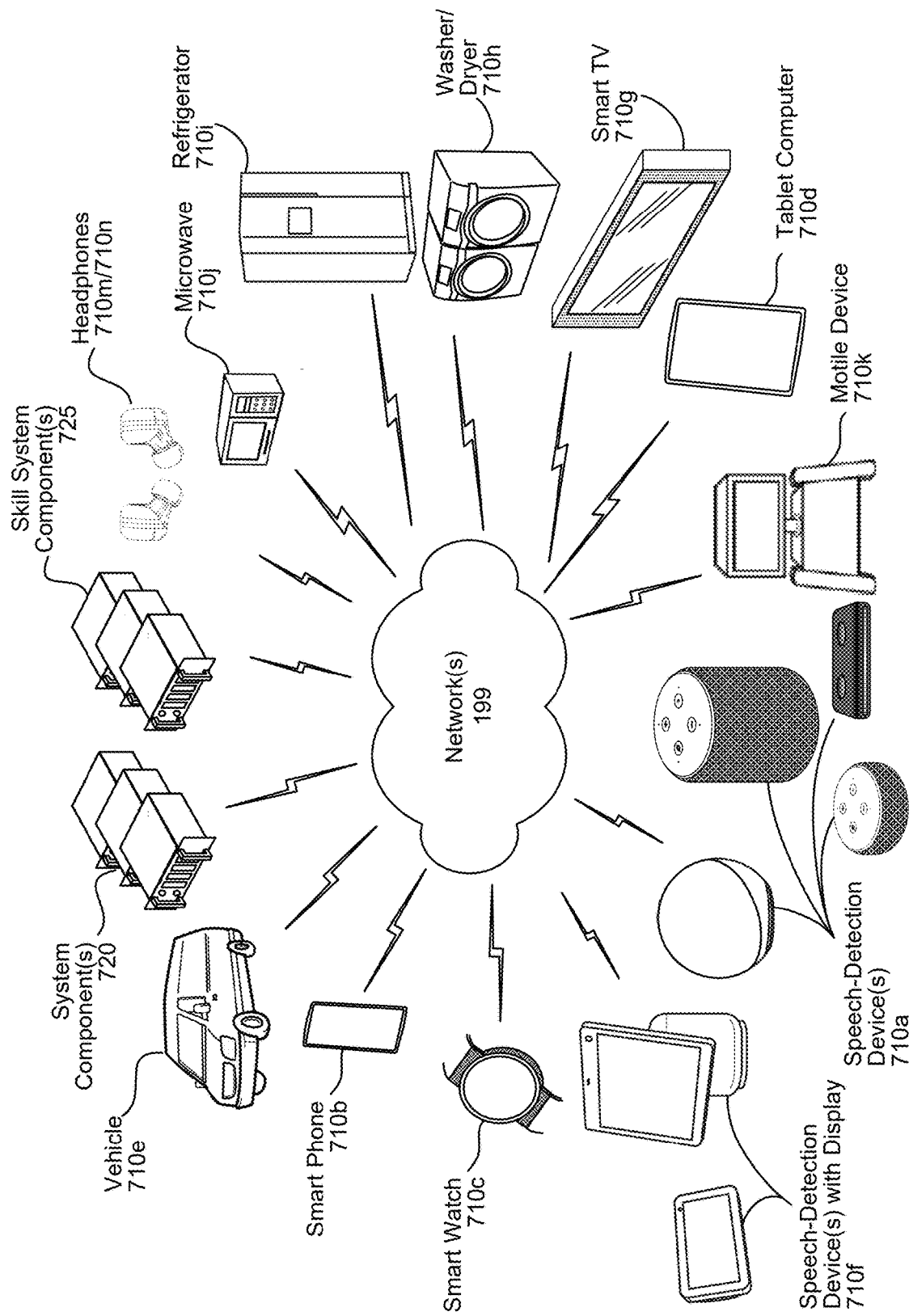
FIG. 10 illustrates an example of a computer network for use with the overall system, according to embodiments of the present disclosure.

As illustrated in FIG. 10, multiple devices (710a-710n, 720, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 710a, a smart phone 710b, a smart watch 710c, a tablet computer 710d, a vehicle 710e, a speech-detection device with display 710f, a display/smart television 710g, a washer/dryer 710h, a refrigerator 710i, a microwave 710j, autonomously motile device 710k (e.g., a robot), etc., may be connected to the network(s) 199 through a wireless service provider, over a Wi-Fi or cellular network connection, or the like. Other devices are included as network-connected support devices, such as the natural language command processing system component(s) 720, the skill system component(s) 725, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 760, etc. of the natural language command processing system component(s) 720.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer-implemented method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving training data including first audio data representing speech and first text data representing a transcript of the speech;
   processing the first audio data using a first neural network encoder to determine first acoustic data;
   processing the first audio data to determine first duration data corresponding to phonemes in the speech;
   determining first data using the first acoustic data and the first duration data;
   determining second data using the first text data and a second neural network encoder, the second data representing first encoded phonemes corresponding to the first text data;
   performing a first joint prediction using a first autoregressive neural network, the first data, and the second data to determine third data representing second acoustic data and second duration data;
   determining first error data based on a comparison of the third data and the first data;
   performing a second joint prediction using the first autoregressive neural network, the first data, and the second data to determine fourth data;
   determining second error data based on a comparison of the fourth data and the second data; and
   determining a second autoregressive neural network using the first error data and the second error data, the second autoregressive neural network representing an updated version of the first autoregressive neural network.

2. The computer-implemented method of claim 1, further comprising:
   receiving second text data for generating synthesized speech;
   processing the second text data using the first neural network encoder to determine fifth data representing second encoded phonemes corresponding to the second text data;
   processing the fifth data using the second autoregressive neural network to generate third acoustic data and third duration data; and
   generating, using the third acoustic data and the third duration data, the synthesized speech.

3. The computer-implemented method of claim 1, further comprising:
   processing the first text data using a language model to generate first context data representing first contextualized word embeddings corresponding to the first text data;
   using the first context data as a conditioning input to the first autoregressive neural network during training;
   receiving second text data for generating synthesized speech;
   processing the second text data using the language model to generate second context data representing second contextualized word embeddings corresponding to the second text data; and
   generating, using the second autoregressive neural network, the second context data, and sixth data representing second encoded phonemes corresponding to the second text data, third acoustic data and third duration data for generating the synthesized speech.

4. The computer-implemented method of claim 1, further comprising:
   processing the first audio data using a speaker encoder to generate a first speaker embedding representing first voice characteristics of a speaker of the speech;
   using the first speaker embedding as a conditioning input to the first autoregressive neural network during training;
   receiving second text data for generating synthesized speech;
   receiving a second speaker embedding representing second voice characteristics for generating the synthesized speech; and
   generating third acoustic data and third duration data for generating the synthesized speech using the second autoregressive neural network, the second speaker embedding, and sixth data representing encoded phonemes corresponding to the second text data.

5. A computer-implemented method comprising:
   operating a first autoregressive model trained to perform a first joint probability prediction based on first encoded acoustic data corresponding to a speech sample and first encoded linguistic unit data corresponding to a transcript of the speech sample to generate second encoded acoustic data;
receiving first input data representing text for generating synthesized speech;
processing the first input data using a first neural network encoder to generate first data representing second encoded linguistic unit data corresponding to the text;
processing the first data using the first autoregressive model to generate (i) second data representing third encoded acoustic data for generating the synthesized speech and (ii) first duration data corresponding to the third encoded acoustic data; and
generating, using the second data and the first duration data, first audio data representing the synthesized speech.

6. The computer-implemented method of claim 5, further comprising:
receiving, prior to receiving the first input data, training data including second audio data representing the speech sample and text data representing the transcript of the speech sample;
determining a first latent representation of the second audio data;
determining a second latent representation of the text data;
performing a second joint prediction using a second autoregressive model, the first latent representation, and the second latent representation to determine first predicted acoustic data and first predicted linguistic data;
determining first error data using the first latent representation and the first predicted acoustic data;
determining second error data using the second latent representation and the first predicted linguistic data; and
determining the first autoregressive model using the first error data and the second error data, the first autoregressive model representing and updated version of the second autoregressive model.

7. The computer-implemented method of claim 6, further comprising:
determining, using the second audio data, second duration data corresponding to linguistic units represented in the speech sample; and
determining, using the second autoregressive model, the first latent representation, and the second latent representation, predicted duration data corresponding to the first predicted acoustic data.

8. The computer-implemented method of claim 7, further comprising:
determining third error data using the second duration data and the predicted duration data, wherein determining the first autoregressive model is additionally based on the third error data.

9. The computer-implemented method of claim 6, further comprising:
determining, using the text data, a plurality of word boundaries represented in the text data;
including, in the second latent representation, a first indication of a first word boundary corresponding to a first word boundary of the plurality of word boundaries;
including, in the second latent representation, a second indication of a pause corresponding to a second word boundary of the plurality of word boundaries;
predicting, using the second autoregressive model, a first pause corresponding to the first indication and a second pause corresponding to the second indication, wherein the first predicted acoustic data represents the first pause and the second pause.

10. The computer-implemented method of claim 9, further comprising:
determining that the first input data includes a third indication of a pause;
including, in the first data, a fourth indication of pause; and
predicting, using the first autoregressive model, a third pause corresponding to the fourth indication, wherein the second data represents the third pause.

11. The computer-implemented method of claim 5, further comprising:
receiving third data representing voice characteristics of a speaker generated using a second neural network encoder and second audio data representing speech samples of the speaker, wherein:
the first neural network encoder additionally processes the third data to generate the first data, and
the first autoregressive model additionally processes the third data to generate the second data.

12. The computer-implemented method of claim 5, further comprising:
processing the first input data using a language model to generate context data representing contextualized word embeddings corresponding to the text, wherein:
the first neural network encoder additionally processes the context data to generate the first data, and
the first autoregressive model additionally processes the context data to generate the second data.

13. A system, comprising:
at least one processor; and
at least one memory comprising instructions that, when executed by the at least one processor, cause the system to:
operate a first autoregressive model trained to perform a first joint probability prediction based on first encoded acoustic data corresponding to a speech sample and first encoded linguistic unit data corresponding to a transcript of the speech sample to generate second encoded acoustic data;
receive first input data representing text for generating synthesized speech;
process the first input data using a first neural network encoder to generate first data representing second encoded linguistic unit data corresponding to the text;
process the first data using the first autoregressive model to generate (i) second data representing third encoded acoustic data for generating the synthesized speech and (ii) first duration data corresponding to the third encoded acoustic data; and
generate, using the second data and the first duration data, first audio data representing the synthesized speech.

14. The system of claim 13, wherein the at least one memory further comprises instructions that, when executed by the at least one processor, further cause the system to:
receive, prior to receiving the first input data, training data including second audio data representing the speech sample and text data representing the transcript of the speech sample;
determine a first latent representation of the second audio data;
determine a second latent representation of the text data;
performing a second joint prediction using a second autoregressive model, the first latent representation, and the second latent representation to determine first predicted acoustic data and first predicted linguistic data;

determine first error data using the first latent representation and the first predicted acoustic data;

determine second error data using the second latent representation and the first predicted linguistic data; and determine the first autoregressive model using the first error data and the second error data, the first autoregressive model representing and updated version of the second autoregressive model.

15. The system of claim 14, wherein the at least one memory further comprises instructions that, when executed by the at least one processor, further cause the system to:

determine, using the second audio data, second duration data corresponding to linguistic units represented in the speech sample; and determine, using the second autoregressive model, the first latent representation, and the second latent representation, predicted duration data corresponding to the first predicted acoustic data.

16. The system of claim 15, wherein the at least one memory further comprises instructions that, when executed by the at least one processor, further cause the system to:

determine third error data using the second duration data and the predicted duration data, wherein determining the first autoregressive model is additionally based on the third error data.

17. The system of claim 14, wherein the at least one memory further comprises instructions that, when executed by the at least one processor, further cause the system to:

determine, using the text data, a plurality of word boundaries represented in the text data;

include, in the second latent representation, a first indication of a first word boundary corresponding to a first word boundary of the plurality of word boundaries;

include, in the second latent representation, a second indication of a pause corresponding to a second word boundary of the plurality of word boundaries; and predict, using the second autoregressive model, a first pause corresponding to the first indication and a second pause corresponding to the second indication, wherein the first predicted acoustic data represents the first pause and the second pause.

18. The system of claim 17, wherein the at least one memory further comprises instructions that, when executed by the at least one processor, further cause the system to:

determine that the first input data includes a third indication of a pause;

include, in the first data, a fourth indication of pause; and predict, using the first autoregressive model, a third pause corresponding to the fourth indication, wherein the second data represents the third pause.

19. The system of claim 13, wherein the at least one memory further comprises instructions that, when executed by the at least one processor, further cause the system to:

receive third data representing voice characteristics of a speaker generated using a second neural network encoder and second audio data representing speech samples of the speaker, wherein:

the first neural network encoder additionally processes the third data to generate the first data, and the first autoregressive model additionally processes the third data to generate the second data.

20. The system of claim 13, wherein the at least one memory further comprises instructions that, when executed by the at least one processor, further cause the system to:

process the first data using a language model to generate context data representing contextualized word embeddings corresponding to the text, wherein:

the first neural network encoder additionally processes the context data to generate the first data, and the first autoregressive model additionally processes the context data to generate the second data.

* * * * *